(No Model.)

H. A. STEPHENSON.
INDEX.

No. 472,630.

Patented Apr. 12, 1892.

X 0 1 2 3 4 5 6 7 8 9 10 11 12 13 14 15 16 17 18

| Ab 1 | Da 330 | Ia 652 | Pa 936 | Ta 1346 | App 1587 |
| Ac 9 | Def 344 | Im 657 | Pap 944 | Tea 1357 | Biog 1789 |
| Ad 17 | Dia 367 | Inc 671 | Pea 959 | | |
| Ae 25 | Do 400 | Inti 710 | Pi 984 | | |
| Al 33 | Ea 423 | Ja 722 | | | |
| Am 42 | El 432 | Jo 727 | | | |
| At 87 | Ep 455 | | | | |
| Av 95 | Exa 472 | | | | |
| Baa 100 | Fab 489 | | | | |
| Bi 130 | | | | | |
| Bor 152 | | | | | |

WITNESSES

INVENTOR

Harvey A. Stephenson
by W. Bakewell & Sons
his Attorneys

UNITED STATES PATENT OFFICE.

HARVEY A. STEPHENSON, OF CRAFTON, PENNSYLVANIA.

INDEX.

SPECIFICATION forming part of Letters Patent No. 472,630, dated April 12, 1892.

Application filed August 4, 1890. Serial No. 360,882. (No model.)

*To all whom it may concern:*

Be it known that I, HARVEY A. STEPHENSON, of Crafton, in the county of Allegheny and State of Pennsylvania, have invented a new and useful Improvement in Indexes, of which the following is a full, clear, and exact description.

My invention, which relates to an improvement in book-indexes, consists in a book having printed or marked on the conjoined outer edges of the leaves an index composed of marks, characters, or alphabetically-arranged letters referring to the divisions of the book, with adjacent numbers indicating the pages on which such divisions are to be found or on which they begin. The edges of the leaves are preferably marked in divisions by colored marks arranged in a substantially horizontal series as near as possible to the level of the page-numbers of the book and indicating divisions of the book into sections or pages, &c., and provided with adjacent figures, which indicate and distinguish such divisions.

The invention is illustrated in the accompanying drawing, which shows in elevation the edge of a book provided with my improved index.

The index is applicable to a large variety of books—such, for example, as dictionaries, digests, commercial-agency reports, directories, encyclopedias, Bibles, ledgers, and generally to books of reference. The drawing shows it applied to a book arranged alphabetically—*e. g.*, a dictionary. In indexing such book I print on the conjoined edges of the leaves in alphabetical order the initial letters of words contained in the book, and adjacent thereto I print figures denoting the numbers of the respective pages on which words having such initial letters are to be found or on which they begin. Thus a reference to the index illustrated in the drawing shows that words beginning with "Ab" are to be found on pages 1, &c., that words beginning with "Pa" are to be found on pages 936, &c. The number of book-divisions which can be represented in this manner is limited only by the size of the edge of the book, which will be found ample to permit the representation of a complete and convenient index. Where the book is not alphabetically arranged, the index may be arranged alphabetically or not, as desired, the divisions being indicated by initial letters or words or characters, according to the nature of the contents.

In indexing a Bible I print on the edges of the leaves the names or abbreviations of the books in succession or alphabetically, and adjacent to each I print the number of the page on which it begins. In addition to the index above described, I may divide the edges of the leaves with differently-colored marks coextensive with divisions of the pages into parts of equal numbers of pages or equal numbers of sections, articles, &c., and may distinguish these marks with proper figures. The drawing shows eighteen of such marks numbered consecutively and indicating divisions of one hundred pages. Each mark begins at the first page of the hundred and ends at the last page. Where the book is divided by sections without reference to the pages, each mark is made coextensive with a certain number of sections. Thus, suppose it be desired to open the book at page (or section) 1050. The reader opens the book at the middle of the "10-mark", and will find the desired place at the opened page or at one of the near-by pages. These marks should be arranged in horizontal series as nearly as possible at the level of the ordinary page-numbers of the book, since when the book is opened by placing the thumb or forefinger at the proper part of the mark the printed page-number at the top corner of the page will be revealed at once. Where, as in the case of dictionaries, the book has, in addition to the pages numbered with Arabic figures, a number of pages forming the preface and indicated by Roman figures, such pages may be indicated by a special mark, as shown in the drawing at X.

My invention will be found to be of great practical convenience and utility. The index is based upon the natural method of ascertaining the places in a book—viz., by reference to the printed page-numbers—and in this respect is vastly superior in directness and time-saving to those artificial systems of indexing in which the book-divisions are indicated without reference to such page-numbers.

The improvement is easy and very cheap in its application, and because it presents the index in a place easy to be seen and examined by the reader it is the means of saving time and trouble in the use of books of reference. Its advantages in this regard will be appreciated by those having occasion to use it.

I claim—

1. A book having on the conjoined edges of the leaves colored marks arranged in a substantially horizontal series at or near the top of the book and at or near the level of the page-numbers and adapted to be used in connection with the latter, said marks corresponding in extent to the thickness of conjoined pages comprised in divisions of the book into parts of an equal number of units each, and adjacent figures distinguishing said marks, substantially as and for the purposes described.

2. A book having printed on the conjoined outer edges of the leaves an index consisting of marks, characters, or alphabetically-arranged letters referring to the divisions of the book and adjacent numbers indicating the proper pages of the book, substantially as and for the purposes described.

In testimony whereof I have hereunto set my hand this 28th day of July, A. D. 1890.

HARVEY A. STEPHENSON.

Witnesses:
W. B. CORWIN,
H. M. CORWIN.